(12) United States Patent
Jindal et al.

(10) Patent No.: US 11,916,698 B2
(45) Date of Patent: *Feb. 27, 2024

(54) DYNAMIC CELLULAR CONNECTIVITY BETWEEN THE HYPERVISORS AND VIRTUAL MACHINES

(71) Applicant: Cisco Technology, Inc., San Jose, CA (US)

(72) Inventors: Rohit Jindal, Los Altos, CA (US); Sabita Jasty, San Jose, CA (US); Madhusudana Rao Kata, Pleasanton, CA (US); Krishna Mohan Menon, San Jose, CA (US); Keith Neil Mark Dsouza, Pacifica, CA (US); Virajitha Karnatapu, Milpitas, CA (US); Yegappan Lakshmanan, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,523

(22) Filed: Mar. 27, 2023

(65) Prior Publication Data

US 2023/0231740 A1 Jul. 20, 2023

Related U.S. Application Data

(63) Continuation of application No. 16/841,637, filed on Apr. 6, 2020, now Pat. No. 11,677,583.

(51) Int. Cl.
*H04L 12/46* (2006.01)
*G06F 9/455* (2018.01)
(Continued)

(52) U.S. Cl.
CPC ...... *H04L 12/4625* (2013.01); *G06F 9/45558* (2013.01); *H04L 45/586* (2013.01);
(Continued)

(58) Field of Classification Search
None
See application file for complete search history.

(56) References Cited

U.S. PATENT DOCUMENTS 9,876,689 B1 * 1/2018 Gan .................. H04L 41/26
2006/0206597 A1 9/2006 Kim et al.
(Continued)

FOREIGN PATENT DOCUMENTS

CN 104704471 A 6/2015
CN 110088732 A 8/2019
(Continued)

OTHER PUBLICATIONS

International Search Report and Written Opinion for International Application No. PCT/US2021/022698, dated Jun. 18, 2021, 11 Pages.
(Continued)

*Primary Examiner* — Ajit Patel
*Assistant Examiner* — Liem H. Nguyen
(74) *Attorney, Agent, or Firm* — Polsinelli P.C.

(57) ABSTRACT

Systems, methods, and computer-readable media for requesting a cellular IP address by initiating a call with a modem, establishing data packet network connectivity with the cellular IP address, assigning the cellular IP address to a virtual L2-bridge interface, wherein the virtual L2-bridge interface includes a MAC address, mapping a MAC address of a virtual machine with the MAC address of the virtual L2-bridge interface, detecting a change in the cellular IP
(Continued)

address, and updating the virtual L2-bridge interface with a different cellular IP address while maintaining the data packet network connectivity.

20 Claims, 12 Drawing Sheets

(51) Int. Cl.
  *H04L 45/586* (2022.01)
  *H04L 49/00* (2022.01)
  *H04L 61/103* (2022.01)
  *H04L 101/622* (2022.01)

(52) U.S. Cl.
  CPC ........ *H04L 49/3009* (2013.01); *H04L 61/103* (2013.01); *G06F 2009/45595* (2013.01); *H04L 2101/622* (2022.05)

(56) References Cited

U.S. PATENT DOCUMENTS

| | | | |
|---|---|---|---|
| 2010/0257269 A1 | 10/2010 | Clark | |
| 2011/0299537 A1* | 12/2011 | Saraiya | H04L 69/16 370/392 |
| 2012/0014387 A1 | 1/2012 | Dunbar et al. | |
| 2012/0054367 A1 | 3/2012 | Ramakrishnan et al. | |
| 2012/0317611 A1* | 12/2012 | Kashyap | H04L 63/0263 726/1 |
| 2013/0308641 A1 | 11/2013 | Ackley | |
| 2013/0336240 A1 | 12/2013 | Cherian | |
| 2014/0146817 A1 | 5/2014 | Zhang | |
| 2015/0074246 A1* | 3/2015 | Premji | H04L 61/5014 709/220 |
| 2015/0078152 A1 | 3/2015 | Garg et al. | |
| 2015/0127830 A1 | 5/2015 | Brown et al. | |
| 2016/0218972 A1* | 7/2016 | Sun | H04L 45/54 |
| 2017/0034053 A1* | 2/2017 | Chanda | H04L 12/4633 |
| 2017/0111443 A1 | 4/2017 | Zhou | |
| 2017/0310554 A1 | 10/2017 | Liu et al. | |
| 2018/0070262 A1 | 3/2018 | Nakano et al. | |
| 2018/0115652 A1 | 4/2018 | Russell et al. | |
| 2018/0287938 A1 | 10/2018 | Han | |
| 2018/0338265 A1* | 11/2018 | Goel | H04L 45/02 |
| 2019/0158396 A1* | 5/2019 | Yu | H04L 61/5007 |
| 2019/0207853 A1 | 7/2019 | Ferriter et al. | |
| 2019/0386882 A1* | 12/2019 | DeCusatis | H04L 41/12 |
| 2020/0073692 A1 | 3/2020 | Rao et al. | |
| 2020/0366553 A1 | 11/2020 | Chanda et al. | |
| 2020/0396179 A1 | 12/2020 | Lochhead et al. | |
| 2021/0288867 A1 | 9/2021 | Sasaki et al. | |
| 2022/0038365 A1* | 2/2022 | Roberts | H04L 41/08 |
| 2022/0368654 A1 | 11/2022 | Jain et al. | |

FOREIGN PATENT DOCUMENTS

| | | |
|---|---|---|
| KR | 20150081654 A * | 7/2015 |
| KR | 20150081654 A | 7/2015 |
| WO | 2020046380 A1 | 3/2020 |
| WO | 2021206881 A1 | 10/2021 |

OTHER PUBLICATIONS

Office Action—Notice of Intention to Grant for Chinese Application No. 202180026239.4, dated Dec. 27, 2023, 10 Pages.

Office Action for Australian Application No. 2021252883, dated Sep. 22, 2023, 4 Pages.

* cited by examiner

DYNAMIC CELLULAR CONNECTIVITY BETWEEN THE HYPERVISORS AND VIRTUAL MACHINES

CROSS-REFERENCE TO RELATED APPLICATIONS

This application is a continuation of U.S. patent Ser. No. 16/841,637, filed on Apr. 6, 2020, the contents of which is expressly incorporated by reference herein in its entirety.

TECHNICAL FIELD

The present technology pertains in general to the field of computer networking, and more particularly, to systems and methods for allowing access of a cellular wide area network (WAN) interface that can be extended to a network function virtualization infrastructure software (NFVIS).

BACKGROUND

The enterprise network landscape is continuously evolving. There is a greater demand for mobile and Internet of Things (IoT) device traffic, Software as a Service (SaaS) applications, and cloud adoption. In addition, security needs are increasing and certain applications can require prioritization and optimization for proper operation. As this complexity grows, there is a push to reduce costs and operating expenses while providing for high availability and scale.

Conventional WAN architectures are facing major challenges under this evolving landscape. Conventional WAN architectures typically consist of multiple Multi-Protocol Label Switching (MPLS) transports, or MPLS paired with Internet or Long-Term Evolution (LTE) links used in an active/backup fashion, most often with Internet or SaaS traffic being backhauled to a central data center or regional hub for Internet access. Issues with these architectures can include insufficient bandwidth, high bandwidth costs, application downtime, poor SaaS performance, complex operations, complex workflows for cloud connectivity, long deployment times and policy changes, limited application visibility, and difficulty in securing the network.

In recent years, Ethernet has been a preferred WAN interface in deployments. Cellular networks such as 4G LTE and 5G is stable, with high data throughput capability and ease of deployment, making them a preferred choice of WAN connectivity among enterprises. This is seen in IoT use cases where the primary, and sometimes the only WAN connectivity option, is cellular 4G LTE or 5G. Applications running on different virtual machines also communicate with the network simultaneously. However, deploying an NFVIS by cellular as the only WAN interface poses problems due to the behavior of cellular networks. For example, cellular modems communicate with a service provider cellular network over the air, with protocols defined by the 3GPP standard. These modems do not have an Ethernet L2. As such, integrating the modems into a system like an L2-bridge poses a challenge.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1A:
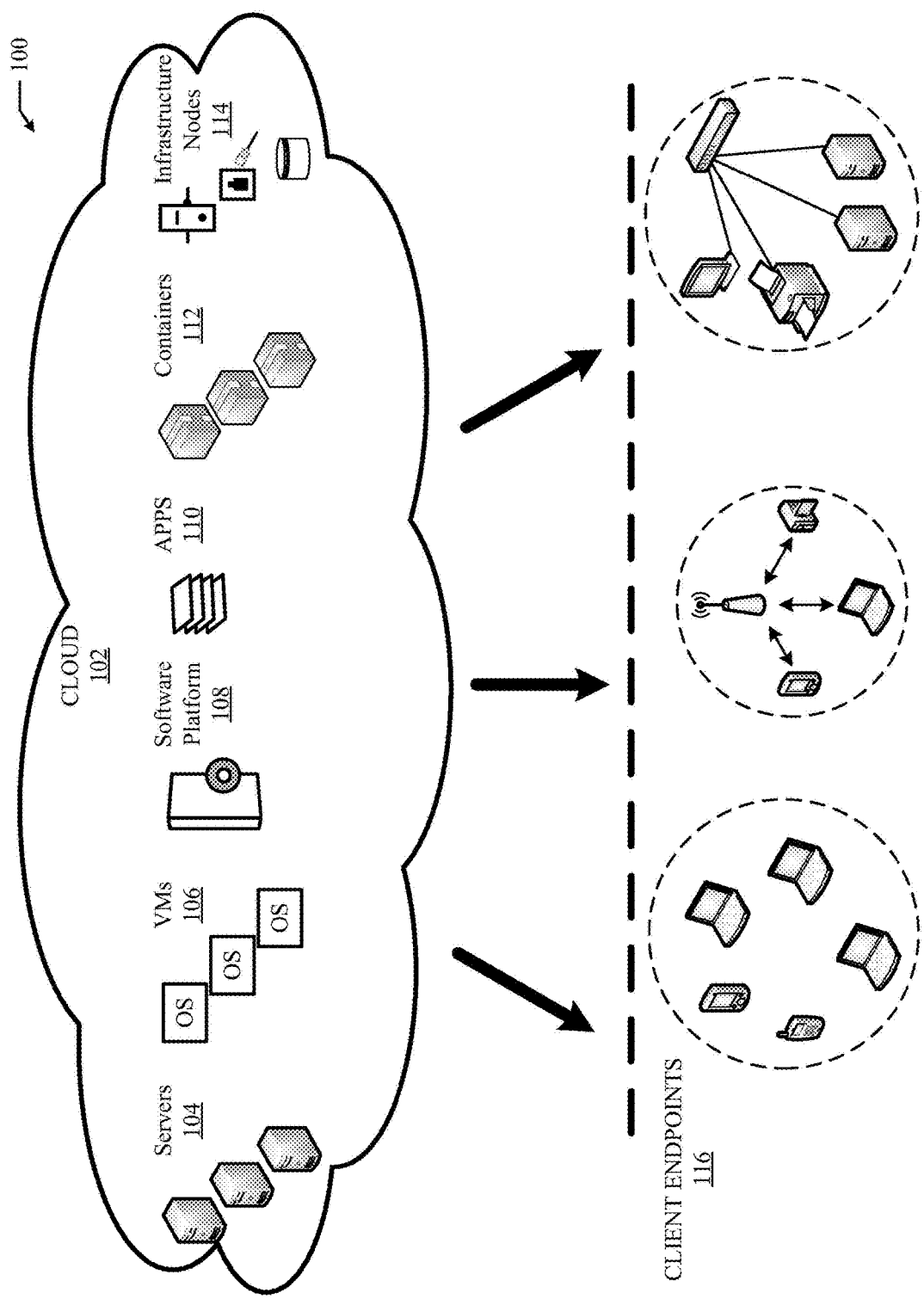
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description.

As used herein, "one embodiment" or "an embodiment" can refer to the same embodiment or any embodiment(s). Moreover, reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Features described herein with reference to one embodiment can be combined with features described with reference to any embodiment.

The terms used in this specification generally have their ordinary meanings in the art, within the context of the disclosure and the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification, including examples of any terms discussed herein, is illustrative and not intended to limit the scope and meaning of the disclosure or any example term. Likewise, the disclosure is not limited to the specific embodiments or examples described in this disclosure.

Without intent to limit the scope of the disclosure, examples of instruments, apparatus, methods and their related functionalities are provided below. Titles or subtitles may be used in the examples for convenience of a reader, and in no way should limit the scope of the disclosure. Unless otherwise defined, technical and scientific terms used herein have the meaning as commonly understood by one of ordinary skill in the art to which this disclosure pertains. In the case of a conflict, the present document and included definitions will control.

Additional features and advantages of the disclosure will be set forth in the description which follows, and in part will be recognized from the description, or can be learned by practice of the herein disclosed principles. The features and advantages of the disclosure can be realized and obtained by means of the instruments and combinations particularly pointed out herein. These and other features of the disclosure will become more fully apparent from the following description and appended claims, or can be learned by the practice of the principles set forth herein.

Overview

A method can include requesting a cellular IP address by initiating a call with a modem. The method can include establishing data packet network connectivity with the cellular IP address. The method can also include assigning the cellular IP address to a virtual L2-bridge interface, wherein the virtual L2-bridge interface includes a MAC address. Further, the method can include mapping a MAC address of a virtual machine with the MAC address of the virtual L2-bridge interface. The method also can include detecting a change in the cellular IP address. Moreover, the method can include updating the virtual L2-bridge interface with a different cellular IP address while maintaining the data packet network connectivity.

The computer-implemented method can be executed by a hypervisor. The MAC address of the virtual L2-bridge interface can be provided in response to an address resolution protocol request. The computer-implemented method can further include replacing MAC addresses of data packets with the MAC address of the virtual L2-bridge interface by a cellular driver. The computer-implemented method also can include receiving the MAC address of the virtual L2-bridge interface at the cellular driver based on an address resolution protocol request. The computer-implemented method can further include adding an L2 header to data packets that correspond to the MAC address of the virtual L2-bridge interface. The computer-implemented method can further include implementing a flow table by an Open vSwitch to connect the virtual machine with the virtual L2-bridge interface.

A system can include one or more processors and at least one computer-readable storage medium storing instructions which, when executed by the one or more processors, cause the one or more processors to request a cellular IP address by initiating a call with a modem. The instructions can also cause the one or more processors to establish data packet network connectivity with the cellular IP address. Further, the instructions can cause the one or more processors to assign the cellular IP address to a virtual L2-bridge interface, wherein the virtual L2-bridge interface includes a MAC address. The instructions also can cause the one or more processors to map a MAC address of a virtual machine with the MAC address of the virtual L2-bridge interface. Moreover, the instructions can cause the one or more processors to detect a change in the cellular IP address. The instructions also can cause the one or more processors to update the virtual L2-bridge interface with a different cellular IP address while maintaining the data packet network connectivity.

A non-transitory computer-readable storage medium having stored therein instructions which, when executed by a processor, cause the processor to request a cellular IP address by initiating a call with a modem. The instructions can also cause the processor to establish data packet network connectivity with the cellular IP address. Further, the instructions can cause the processor to assign the cellular IP address to a virtual L2-bridge interface, wherein the virtual L2-bridge interface includes a MAC address. The instructions also can cause the processor to map a MAC address of a virtual machine with the MAC address of the virtual L2-bridge interface. Moreover, the instructions can cause the processor to detect a change in the cellular IP address. The instructions also can cause the processor to update the virtual L2-bridge interface with a different cellular IP address while maintaining the data packet network connectivity.

Description of Example Embodiments

The disclosed technology addresses the need in the art for establishing an L2-bridge interface in a cellular environment where an L2-bridge does not exist. In particular, the disclosed technology addresses the need in the art for establishing an L2-bridge interface in a cellular environment with a virtual L2-bridge. The present technology involves systems, methods, and computer-readable media for performing threat remediation through a switch fabric of a virtualized network environment. In particular, the present technology can involve systems, methods, and computer-readable media for requesting a cellular IP address by initiating a call with a modem, establishing data packet network connectivity with the cellular IP address, assigning the cellular IP address to a virtual L2-bridge interface, wherein the virtual L2-bridge interface includes a MAC address, mapping a MAC address of a virtual machine with the MAC address of the virtual L2-bridge interface, detecting a change in the cellular IP address, and updating the virtual L2-bridge interface with a different cellular IP address while maintaining the data packet network connectivity.

Figure 7:
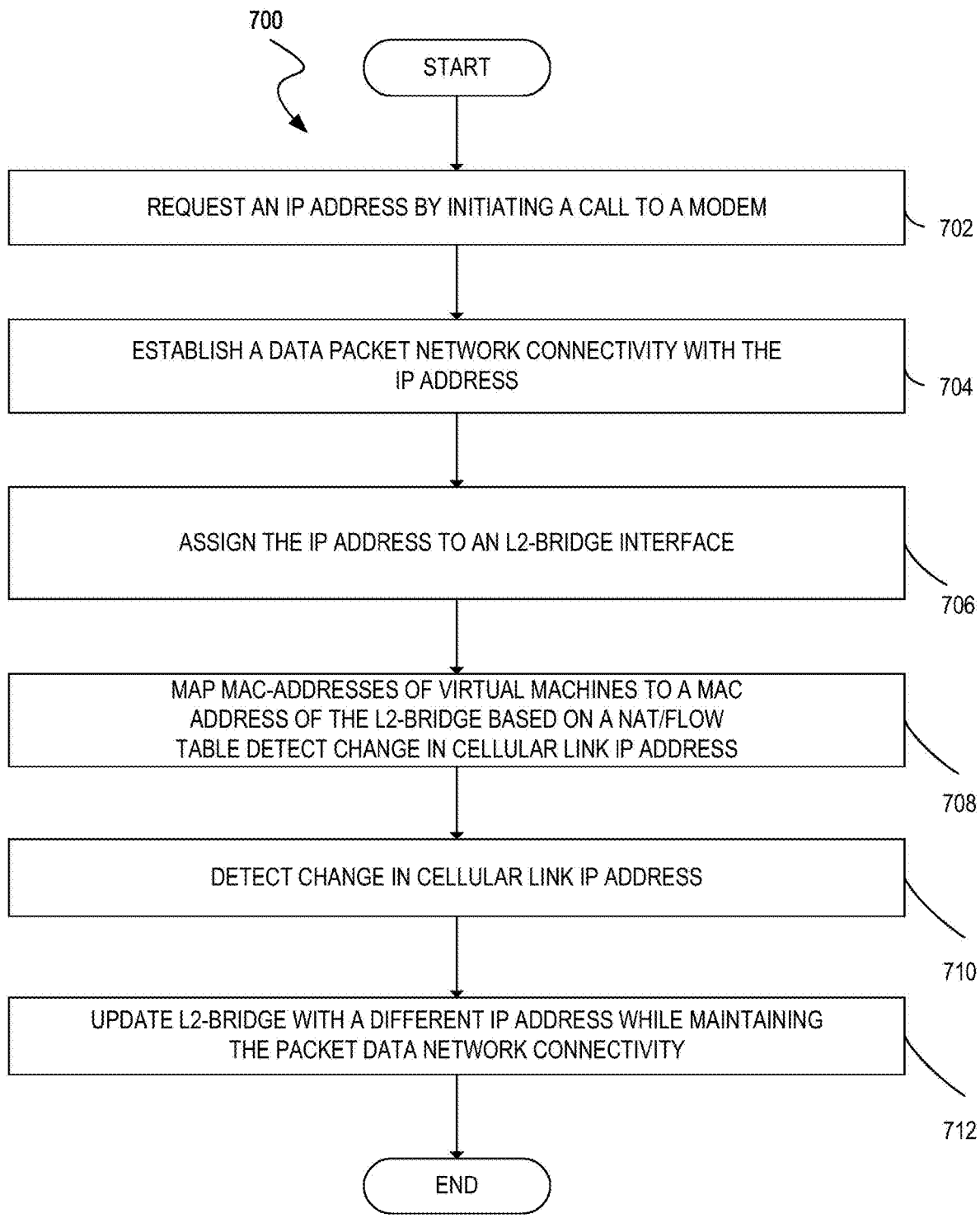
FIG. 7 illustrates an example of a flow chart for a network function virtualization infrastructure software process in accordance with an embodiment.
Figure 8:
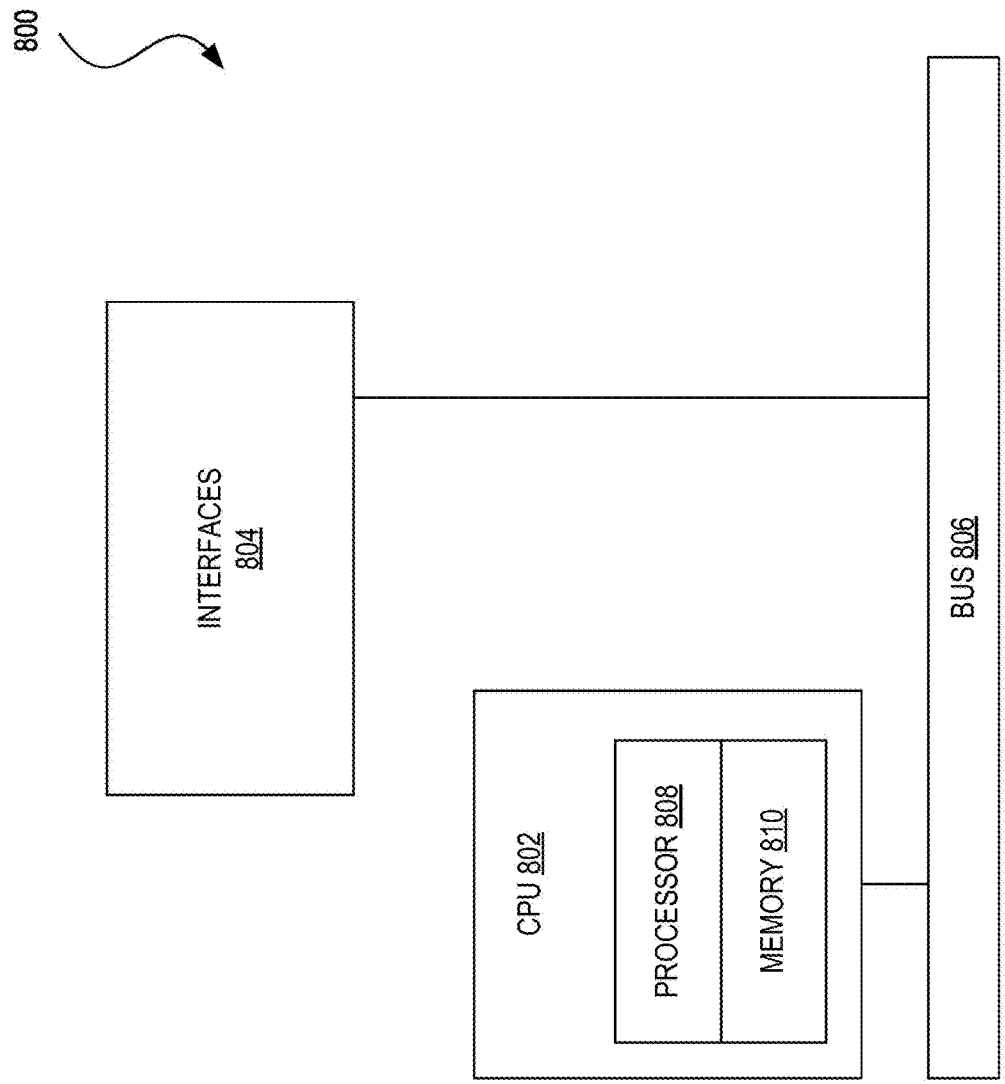
FIG. 8 illustrates an example network device.
Figure 9:
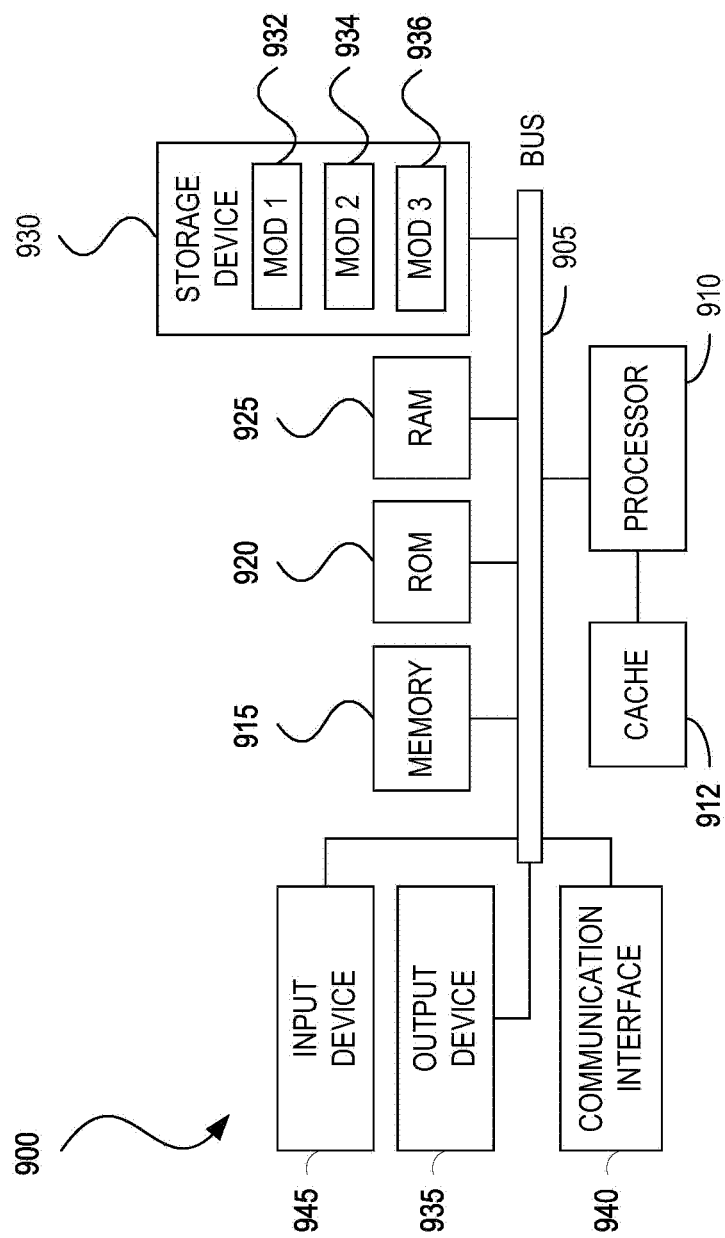
FIG. 9 illustrates an example computing system.

A description of network environments and architectures for network data access and services, as illustrated in FIGS. 1A, 1B, 2A, 2B, 3, 4, and 5, is first disclosed herein. A discussion of systems, methods, and computer-readable media for establishing a virtual L2-bridge interface in a cellular environment, as shown in FIGS. 6 and 7, will then follow. The discussion then concludes with a brief description of example devices, as illustrated in FIGS. 8 and 9. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, VMs 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
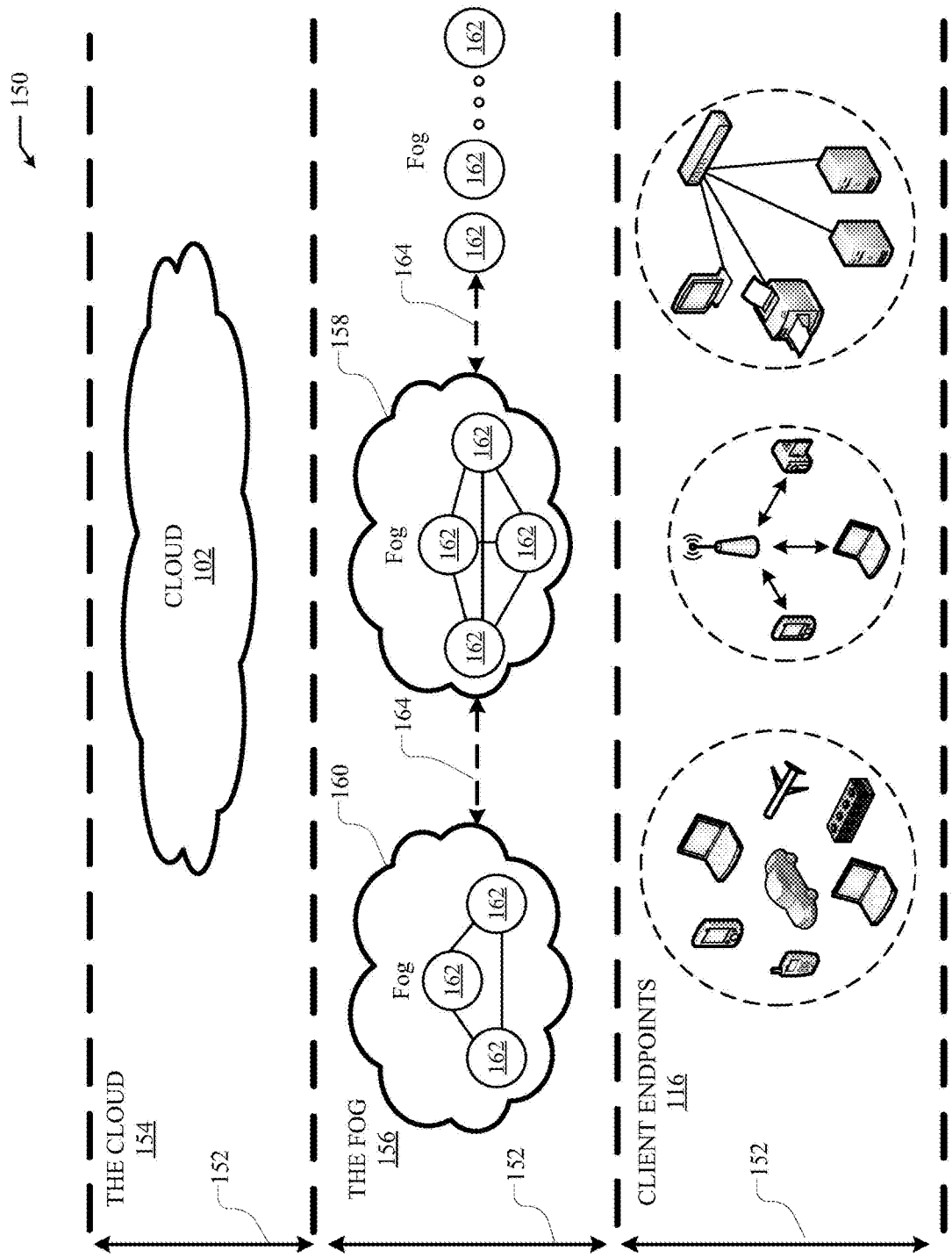
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographical locations, logical locations or networks, and/or fog instances while maintaining connectivity with the cloud layer 154 and/or the endpoints 116. For example, a particular fog node can be placed in a vehicle, such as an aircraft or train, which can travel from one geographical location and/or logical location to a different geographical location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
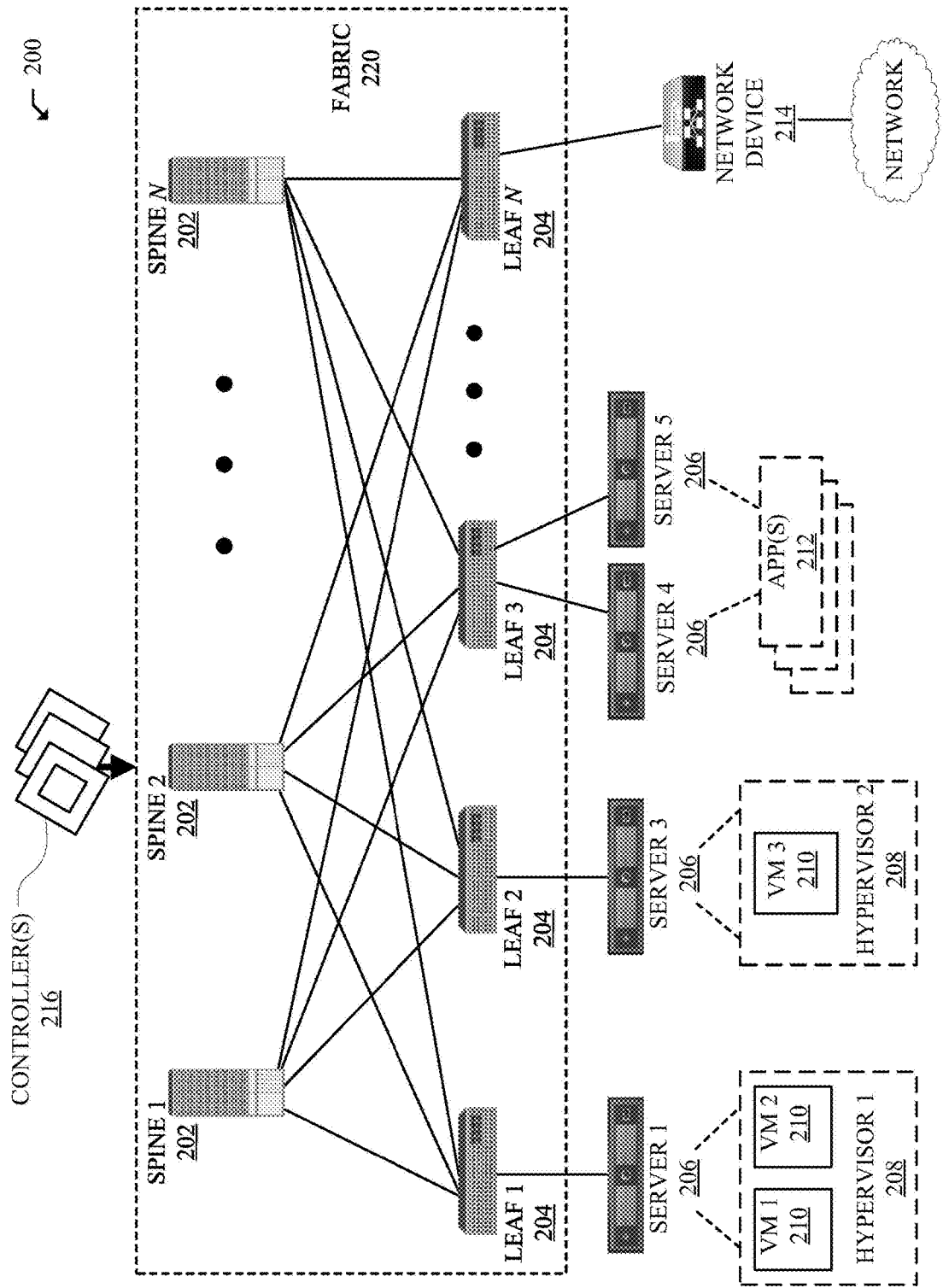
FIG. 2A illustrates a diagram of an example network environment, such as a data center.

FIG. 2A illustrates a diagram of an example Network Environment 200, such as a data center. In some cases, the Network Environment 200 can include a data center, which can support and/or host the cloud 102. The Network Environment 200 can include a Fabric 220 which can represent the physical layer or infrastructure (e.g., underlay) of the Network Environment 200. Fabric 220 can include Spines 202 (e.g., spine routers or switches) and Leafs 204 (e.g., leaf routers or switches) which can be interconnected for routing or switching traffic in the Fabric 220. Spines 202 can interconnect Leafs 204 in the Fabric 220, and Leafs 204 can connect the Fabric 220 to an overlay or logical portion of the Network Environment 200, which can include application services, servers, virtual machines, containers, endpoints, etc. Thus, network connectivity in the Fabric 220 can flow from Spines 202 to Leafs 204, and vice versa. The interconnections between Leafs 204 and Spines 202 can be redundant (e.g., multiple interconnections) to avoid a failure in routing. In some embodiments, Leafs 204 and Spines 202 can be fully connected, such that any given Leaf is connected to each of the Spines 202, and any given Spine is connected to each of the Leafs 204. Leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more Controllers 216, and/or implemented or enforced by one or more devices, such as Leafs 204. Leafs 204 can connect other elements to the Fabric 220. For example, Leafs 204 can connect Servers 206, Hypervisors 208, VMs 210, Applications 212, Network Device 214, etc., with Fabric 220. Such elements can reside in one or more logical or virtual layers or networks, such as an overlay network. In some cases, Leafs 204 can encapsulate and decapsulate packets to and from such elements (e.g., Servers 206) in order to enable communications throughout Network Environment 200 and Fabric 220. Leafs 204 can also provide any other devices, services, tenants, or workloads with access to Fabric 220. In some cases, Servers 206 connected to Leafs 204 can similarly encapsulate and decapsulate packets to and from Leafs 204. For example, Servers 206 can include one or more virtual switches or routers or tunnel endpoints for tunneling packets between an overlay or logical layer hosted by, or connected to, Servers 206 and an underlay layer represented by Fabric 220 and accessed via Leafs 204.

Applications 212 can include software applications, services, containers, appliances, functions, service chains, etc. For example, Applications 212 can include a firewall, a database, a CDN server, an IDS/IPS, a deep packet inspection service, a message router, a virtual switch, etc. An application from Applications 212 can be distributed, chained, or hosted by multiple endpoints (e.g., Servers 206, VMs 210, etc.), or may run or execute entirely from a single endpoint.

VMs 210 can be virtual machines hosted by Hypervisors 208 or virtual machine managers running on Servers 206. VMs 210 can include workloads running on a guest operating system on a respective server. Hypervisors 208 can provide a layer of software, firmware, and/or hardware that creates, manages, and/or runs the VMs 210. Hypervisors 208 can allow VMs 210 to share hardware resources on Servers 206, and the hardware resources on Servers 206 to appear as multiple, separate hardware platforms. Moreover, Hypervisors 208 on Servers 206 can host one or more VMs 210.

In some cases, VMs 210 can be migrated to other Servers 206. Servers 206 can similarly be migrated to other physical locations in Network Environment 200. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 206, Hypervisors 208, and/or VMs 210 can represent or reside in a tenant or customer space. Tenant space can include workloads, services, applications, devices, networks, and/or resources that are associated with one or more clients or subscribers. Accordingly, traffic in Network Environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 216, Servers 206, Leafs 204, etc.

Configurations in Network Environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined networking (SDN) framework (e.g., Application-Centric Infrastructure (ACI) or VMWARE NSX). To illustrate, one or more administrators can define configurations at a logical level (e.g., application or software level) through Controllers 216, which can implement or propagate such configurations through Network Environment 200. In some examples, Controllers 216 can be Application Policy Infrastructure Controllers (APICs) in an ACI framework. In other examples, Controllers 216 can be one or more management components for associated with other SDN solutions, such as NSX Managers.

Such configurations can define rules, policies, priorities, protocols, attributes, objects, etc., for routing and/or classifying traffic in Network Environment 200. For example, such configurations can define attributes and objects for classifying and processing traffic based on Endpoint Groups, Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 200, such as Leafs 204, Servers 206, Hypervisors 208, Controllers 216, etc. As previously explained, Network Environment 200 can be configured according to one or more particular SDN solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by ACI virtual edge (AVE), which can run on a host, such as a server, e.g. a vSwitch running on a server. For example, the AVE can classify traffic based on specified attributes, and tag packets of different attribute EPGs with different identifiers, such as network segment identifiers (e.g., VLAN ID). Finally, Leafs 204 can tie packets with their attribute EPGs based on their identifiers and enforce policies, which can be implemented and/or managed by one or more Controllers 216. Leaf 204 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, Network Environment 200 can deploy different hosts via Leafs 204, Servers 206, Hypervisors 208, VMs 210, Applications 212, and Controllers 216, such as VMWARE ESXi hosts, WINDOWS HYPER-V hosts, bare metal physical hosts, etc. Network Environment 200 may interoperate with a variety of Hypervisors 208, Servers 206 (e.g., physical and/or virtual servers), SDN orchestration platforms, etc. Network Environment 200 may implement a declarative model to allow its integration with application design and holistic network policy.

Controllers 216 can provide centralized access to fabric information, application configuration, resource configuration, application-level configuration modeling for a SDN infrastructure, integration with management systems or servers, etc. Controllers 216 can form a control plane that interfaces with an application plane via northbound APIs and a data plane via southbound APIs.

As previously noted, Controllers 216 can define and manage application-level model(s) for configurations in Network Environment 200. In some cases, application or device configurations can also be managed and/or defined by other components in the network. For example, a hypervisor or virtual appliance, such as a VM or container, can run a server or management tool to manage software and services in Network Environment 200, including configurations and settings for virtual appliances.

As illustrated above, Network Environment 200 can include one or more different types of SDN solutions, hosts, etc. For the sake of clarity and explanation purposes, various examples in the disclosure will be described with reference to an ACI framework, and Controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 206 (e.g., physical or logical), Hypervisors 208, VMs 210, containers (e.g., Applications 212), etc., and can run or include any type of server or application solution. Non-limiting examples of "hosts" can include virtual switches or routers, such as distributed virtual switches (DVS), AVE nodes, vector packet processing (VPP) switches; VCENTER and NSX MANAGERS; bare metal physical hosts; HYPER-V hosts; VMs; DOCKER Containers; etc.

Figure 2B:
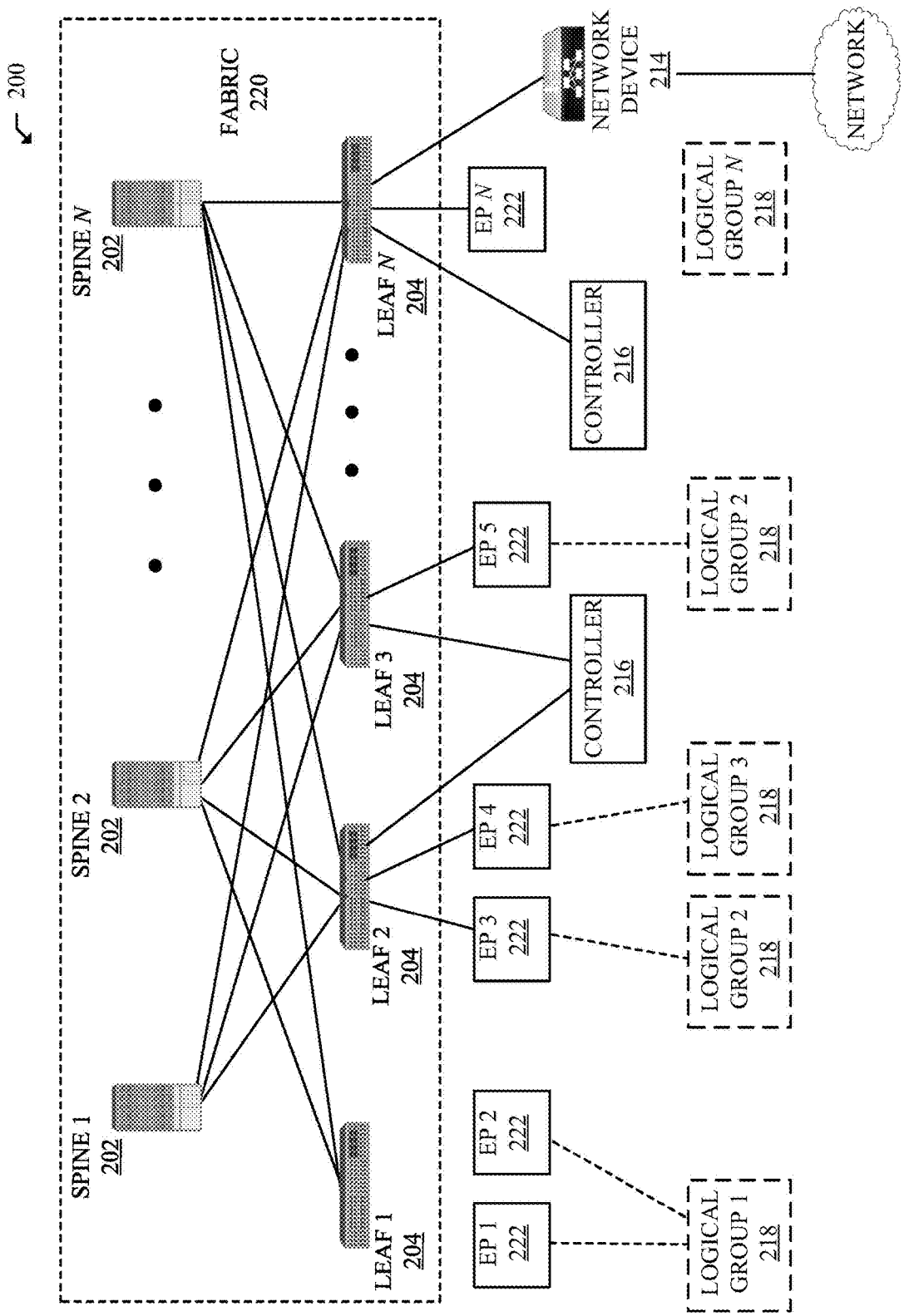
FIG. 2B illustrates another example of a network environment.

FIG. 2B illustrates another example of Network Environment 200. In this example, Network Environment 200 includes Endpoints 222 connected to Leafs 204 in Fabric 220. Endpoints 222 can be physical and/or logical or virtual entities, such as servers, clients, VMs, hypervisors, software containers, applications, resources, network devices, workloads, etc. For example, an Endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective Logical Groups 218. Logical Groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 218 are EPGs in an ACI environment and/or other logical groups (e.g., SGs) in another SDN environment.

Traffic to and/or from Endpoints 222 can be classified, processed, managed, etc., based Logical Groups 218. For example, Logical Groups 218 can be used to classify traffic to or from Endpoints 222, apply policies to traffic to or from Endpoints 222, define relationships between Endpoints 222, define roles of Endpoints 222 (e.g., whether an endpoint consumes or provides a service, etc.), apply rules to traffic to or from Endpoints 222, apply filters or access control lists (ACLs) to traffic to or from Endpoints 222, define communication paths for traffic to or from Endpoints 222, enforce requirements associated with Endpoints 222, implement security and other configurations associated with Endpoints 222, etc.

In an ACI environment, Logical Groups 218 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between EPs or EPGs. For example, a Web EPG can provide a service that a Client EPG consumes, and that consumption can be subject to a filter (ACL) and a service graph that includes one or more services, such as firewall inspection services and server load balancing.

Figure 3:
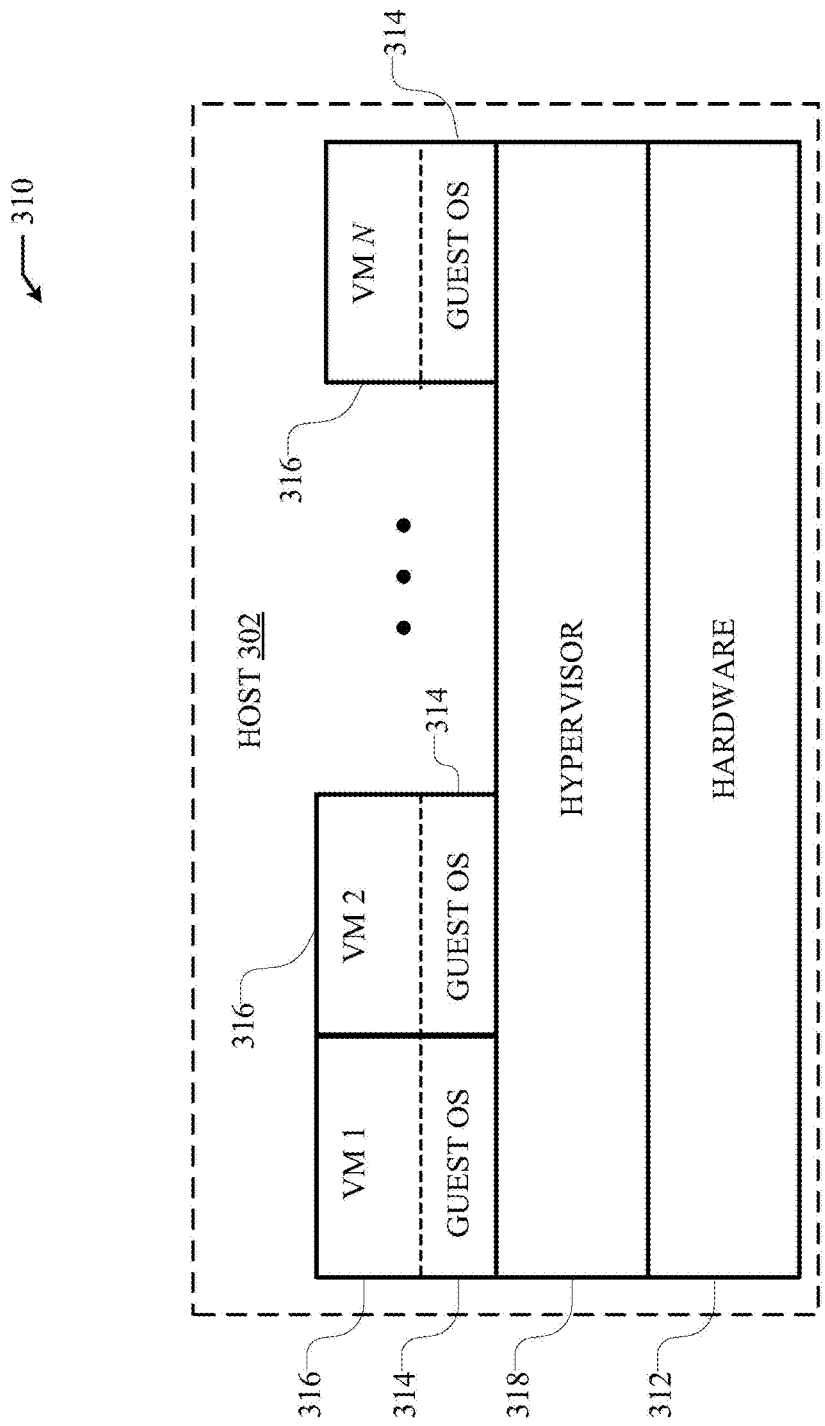
FIG. 3 illustrates a schematic diagram of an example virtual machine (VM) deployment.

FIG. 3 illustrates a schematic diagram of an example virtual machine (VM) deployment 310. In this example, the host 302 can include one or more VMs 316. The VMs 316 can be configured to run workloads like VNFs based on hardware resources 312 on the host 302. The VMs 316 can run on guest operating systems 314 on a virtual operating platform provided by a hypervisor 318. Each VM can run a respective guest operating system which can be the same or different as other guest operating systems associated with other VMs on the host 302. Moreover, each VM can have one or more network addresses, such as an internet protocol (IP) address. The VMs 316 can communicate with hypervisors 318 and/or any remote devices or networks using the one or more network addresses.

Hypervisors 318 can be a layer of software, firmware, and/or hardware that creates and runs VMs 316. For example, the hypervisors 318 can be virtual machine managers (VMM) for hosting and managing the VMs 316. The guest operating systems running on VMs 316 can share virtualized hardware resources created by the hypervisors 318. The virtualized hardware resources can provide the illusion of separate hardware components. Moreover, the virtualized hardware resources can perform as physical hardware components (e.g., memory, storage, processor, network interface, etc.), and can be driven by the hardware resources 312 on the host 302. Hypervisors 318 can have one or more network addresses, such as an internet protocol (IP) address, to communicate with other devices, components, or networks. For example, the hypervisors 318 can have a dedicated IP address which they can use to communicate with VMs 316 and/or any remote devices or networks.

Hardware resources 312 can provide the underlying physical hardware driving operations and functionalities provided by the host 302, hypervisors 318, and VMs 316. Hardware resources 312 can include, for example, one or more memory resources, one or more storage resources, one or more communication interfaces, one or more processors, one or more circuit boards, one or more extension cards, one or more power supplies, one or more antennas, one or more peripheral components, etc.

The host 302 can also include one or more host operating systems (not shown). The number of host operating system can vary by configuration. For example, some configurations can include a dual boot configuration that allows the host 302 to boot into one of multiple host operating systems. In other configurations, the host 302 may run a single host operating system. Host operating systems can run on hardware resources 312. In some cases, a hypervisor 318 can run on, or utilize, a host operating system on the host 302.

The host 302 can also have one or more network addresses, such as an internet protocol (IP) address, to communicate with other devices, components, or networks. For example, the host 302 can have an IP address assigned to a communications interface from hardware resources 312, which it can use to communicate with VMs 316, hypervisor 318, switches, and/or any remote devices or networks.

In some examples, the host 302 can run a distributed function router. For example, VMs 316 on host 302 can host and execute one or more functionalities of the distributed function router. In some cases, host 302 can also host multiple distributed function routers via VMs 316. For example, VM 1 can host and run a first distributed function router and VM 2 can host and run a second distributed function router. The first and second distributed function routers can be different function routers or may be instances of a same function router which can be configured for load balancing, failover, auto-scaling, etc.

As discussed previously, the increased use of virtualized network environments in the field of networking has raised additional security concerns, in particular as attackers become more sophisticated. Specifically, virtualized network environments are susceptible to a wide variety of network threats, such as rogue VMs, denial-of-service (DoS) attacks, malware attacks, and other applicable types of malicious data traffic. A number of different tools have been developed to detect and isolate such threats at the VMs and the hypervisors supporting the VMs in a virtualized network environment. However, such tools suffer from a number of deficiencies. Specifically, network threats have already crossed the switch fabric of a virtualized network environment when threat remediation is performed in the hypervisor layer or the VM layer. As a result, a large number of VMs can be exposed to the network threat making it more difficult and costly from a computational perspective to isolate and remedy the threat. Further, this can cause increased latency in the virtualized network environment, e.g. as a result of the large amount of computational resources used to isolate and remedy the threat.

The present includes systems, methods, and computer-readable media for solving these problems/discrepancies. Specifically, the present technology involves systems, methods, and computer-readable media for performing threat remediation through a switch fabric of a virtualized network environment. In particular, the present technology involves systems, methods, and computer-readable media for identifying a network threat at a switch fabric of a virtualized network environment and performing one or more remedial measures before the threat is propagated further into the network environment beyond the switch fabric.

Figure 4:
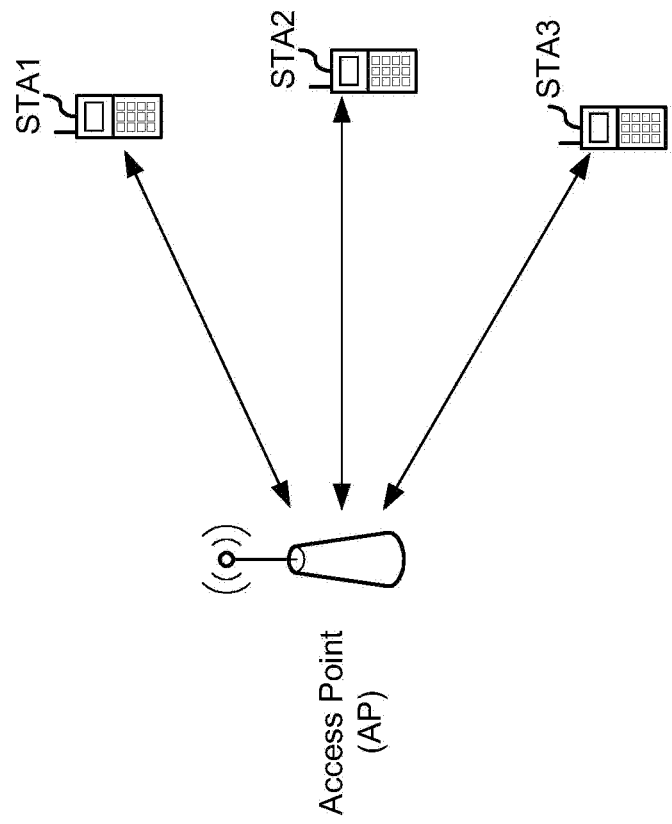
FIG. 4 illustrates an example wireless communication network.

FIG. 4 illustrates an example wireless communication network 400 in which some aspects of the technology can be implemented. The wireless communication network 400 can form an enterprise wireless network. In turn, the systems and techniques described herein can be utilized in controlling link selection and aggregation across the wireless communication network 400 and another network.

The wireless communication network 400 includes an Access Point (AP), configured for wireless communication with multiple receivers or client devices (e.g., STA1, STA2, and STA3). It is understood that additional (or fewer) STAs and/or APs could be implemented in network 400, without departing from the scope of the technology. The STAs and AP shown in FIG. 4 can be configured to form a WiFi network. A WiFi network, as used herein, is a network that is formed in maintained in accordance with the Institute of Electrical and Electronics Engineers (IEEE) 802.11 family of standards. Specifically, the AP and the STAs can wirelessly communicate with each other according to the IEEE 802.11 family of standards to form a WiFi network.

The AP may have access or interface to a Distribution System (DS) or another type of wired/wireless network that may carry traffic in and out of a basic service set (BSS) (not illustrated). Thus traffic to STAs can originate from outside the BSS, and arrive through the AP for delivery to the STAs. Conversely, traffic originating from STAs to destinations outside the BSS can be sent to the AP to be delivered to the respective destinations. Traffic between STAs within the BSS can be sent through the AP where the source STA may send traffic to the AP and the AP may deliver the traffic to the destination STA. The traffic between STAs within a BSS may be peer-to-peer traffic.

Using the IEEE 802.11 infrastructure mode of operation, the AP can transmit on a fixed channel, for example that is 20 MHz wide, and designated as the operating channel of the BSS. This channel may also be used by the STAs to establish a connection with the AP. The channel access in an IEEE 802.11 system may be Carrier Sense Multiple Access with Collision Avoidance (CSMA/CA). In this mode of operation, the STAs, including the AP, can sense the primary channel. If the channel is detected to be busy, the STA may back off. If the channel is detected to be free, the STA may acquire the channel and transmit data. Alternatively, the AP can implement an applicable form of direct scheduling, e.g. Orthogonal Frequency Division Multiple Access (OFDMA) scheduling, to control contention and collision avoidance between the STAs.

It is understood that network 400 can implement various wireless standards using different channel sizes (bandwidths), without departing from the technology. By way of example, IEEE 802.11n, High Throughput (HT) STAs may be used, e.g., implementing a 40 MHz communication channel. This can be achieved, for example, by combining a primary 20 MHz channel, with an adjacent 20 MHz channel to form a 40 MHz wide contiguous channel. In IEEE 802.11a/c, very high throughput (VHT) STAs can also be supported, e.g., 20 MHz, 40 MHz, 80 MHz, and/or 160 MHz wide channels. The 40 MHz, and 80 MHz, channels can be formed, e.g., by combining contiguous 20 MHz channels. A 160 MHz channel may be formed, for example, by combining eight contiguous 20 MHz channels, or by combining two non-contiguous 80 MHz channels (e.g., referred to as an 80+80 configuration).

Figure 5:
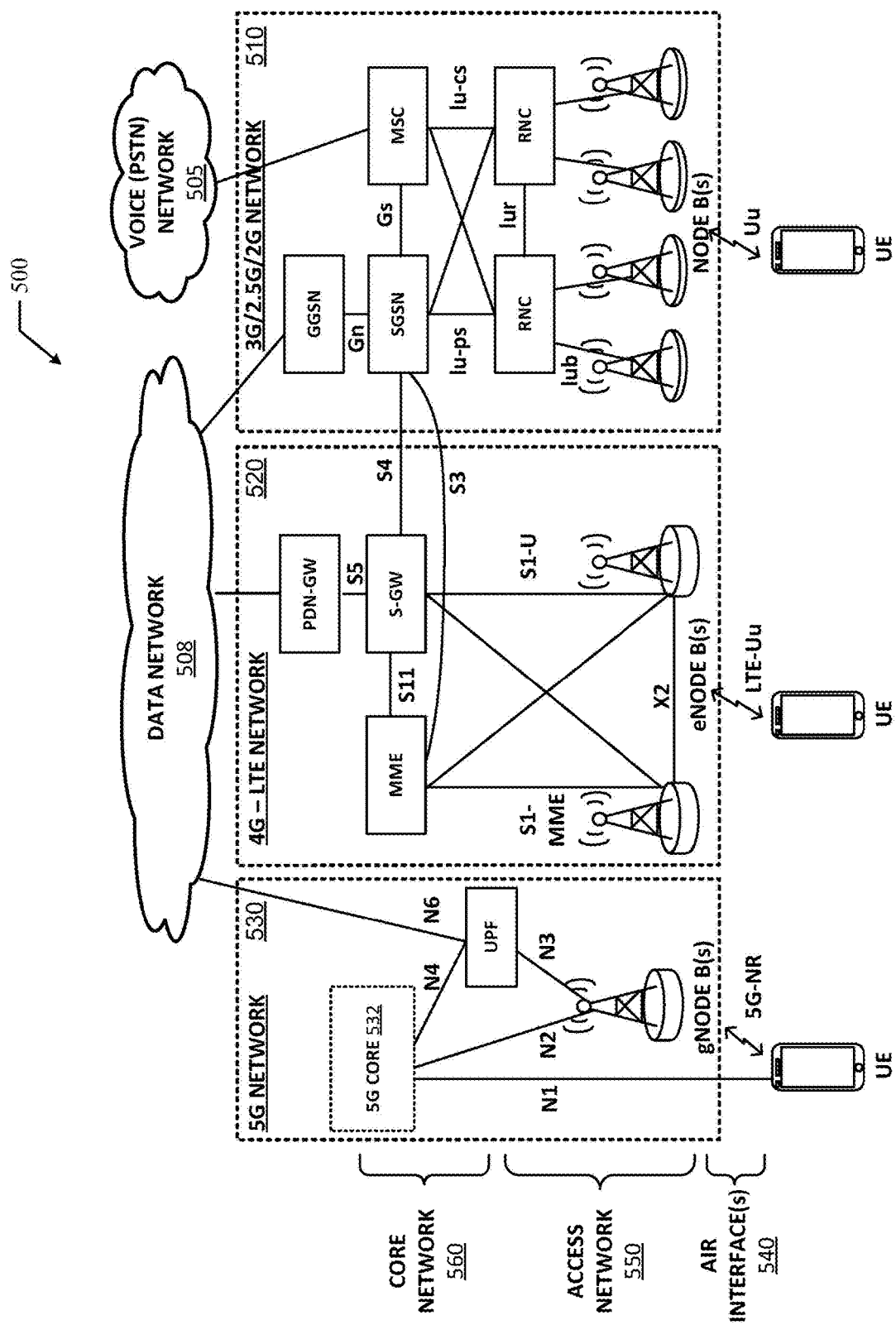
FIG. 5 illustrates a schematic block diagram of example telecommunication networks.

FIG. 5 illustrates a schematic block diagram of example telecommunication networks 500, including a 3G network 510, a 4G network 520, and 5G network 530. Telecommunication networks 500 include wireless network interfaces or communication links, such as air interfaces 540, an access network 550, which represents radio infrastructure or radio towers, and a core network 560, which represents respective core network entities, network modules, or Network Functions (NF(s)). The wireless network interfaces or air interfaces 540 include Uu links for 3G network 510, LTE-Uu links for 4G network 520, and 5G-NR links for 5G network 530. In addition, other network interfaces (e.g., Nx, Sx, Lu-x, Gx, etc.) generally interconnect certain nodes (e.g., UE and/or core network entities) with other nodes (e.g., other UE and/or core network entities) based on, for example, distance, signal strength, network topology, current operational status, location, etc. As is appreciated by those skilled in the art, the network interfaces are vehicles for exchanging data packets (e.g., traffic and/or messages) between the nodes using predefined network protocols such as known wired protocols as appropriate. In this context, a protocol consists of a set of rules defining how the nodes interact with each other.

Those skilled in the art will understand that any number of nodes, devices, communication links, and the like may be used, and that the view shown herein is for simplicity. In particular, the representations of telecommunication networks 500, including respective interconnected network entities, are illustrated and described herein for purposes of discussion, not limitation, and it is appreciated that the illustrated networks can include (or exclude) any number of network entities, communication links, and the like, and can support inter-network operability and compatibility.

Access network 550 represents the infrastructure or radio towers, such as a Radio Access Network (RAN), for receiving and transmitting data packets between end user nodes (UE) as well as the various network entities (e.g., core network entities). Access network 550 includes NodeBs (NBs) for 3G network 510, eNodeBs (eNBs) for 4G network 520, and gNodeBs (gNBs) for 5G network 530. The infrastructure for each network may support different functionality and it is appreciated that infrastructure illustrated within one network can include appropriate hardware/software to support functionality of other telecommunication networks.

Respective network entities that form core network 560 (within the telecommunication networks 500) operatively connect respective RAN infrastructure (NB s, eNBs, gNBs) to third party networks such as a voice network 505 (e.g., a Public Switched Telephone Network (PSTN) network) and/or a data network 508 to create end-to-end connections. Prior to 3G (e.g., 2G, 2.5G, etc.) the third party network primarily included a voice network/PSTN 505 (e.g., a circuit switched network). From 3G onward, the third party network transitioned to include a public network (e.g., the Internet), represented by data network 508 (e.g., a packet switched network). Core network 560 and its respective network entities collectively operate to manage connections, bandwidth, and mobility for respective UE.

Notably, core network 560 evolved along three functional planes, including service management, session management, and mobility management. Service management for 2G and 3G networks includes operations to create an Integrated Services Digital Network (ISDN) over wireless links (e.g., Uu links). Session management for 3G and 4G networks generally include operations establish, maintain, and release network resources (e.g., data connections). In particular, in 3G network 510, session management includes a standalone General Packet Radio Service (GPRS) network, while 4G network 520 introduced a fully integrated data only network optimized for mobile broadband (where basic telephone operations are supported as one profile). Mobility management generally includes operations that support movement of UE in a mobile network, such as system registration, location tracking and handover (e.g., often optimized reduce heavy signaling loads). For example, in the context of 4G network 520, a Serving Gateway (SGW) and a Packet Data Gateway (PGW) support session management operations while mobility management operations (which maintains data sessions for mobile UE) are centralized within a Mobility Management Entity (MME).

5G network 530 introduces a new service base architecture (SBA) 532, which generally redistributes functionality of 4G network entities into smaller service-based functions/network entities. In addition, packet routing and forwarding functions (which are performed by SGW and PGW in 4G network 520) are realized as services rendered through a new network function/entity called the User Plane Function (UPF). In this fashion, 5G network 530 provides a modular set of services that support dynamic and scalable deployment of resources to satisfy diverse user demands.

As discussed previously, current mobile devices typically support at least two wireless interfaces to different wireless networks. For example, current mobile devices typically have a wireless interface to a cellular network, e.g. LTE network, and a wireless interface to an enterprise wireless network, e.g. WiFi network. In turn, the mobile devices can access network services through either or both of the cellular network and the enterprise wireless network using the corresponding network interfaces. However, providing capabilities to access network services through multiple networks can create problems with respect to link selection and aggregation across the networks.

Specifically and as discussed previously, as cellular networks and enterprise wireless networks are typically maintained by separate entities, problems with respect to link selection and aggregation across the networks can arise. In particular, operators of different wireless networks can implement conflicting techniques for performing link selection and aggregation across the networks. For example, cellular operators have attempted to deploy 3GPP's HetNet approaches to control link selection and aggregation. In HetNet approaches, enterprise wireless network link selection and aggregation is controlled by a cellular operator via ANDSF. However, this policy is not congruent with the policies of enterprise wireless network/WiFi operators who typically prefer to provide wireless network service access through the enterprise network because of the enhanced security it provides. Specifically, HetNet approaches treat both WiFi networks and cellular networks as equally viable, e.g. using radio-level KPIs to ultimately select the network, in contrast to the policies of WiFi operators which may prefer WiFi as the network of choice. On the enterprise network side, MBO has been proposed as a way for a mobile device to advertise its cellular modem availability for cellular network access. However, MBO does not address the link selection process across both cellular and WiFi networks, e.g. no preference is presumed between the networks.

Further and as discussed previously, providing separate interfaces to a plurality of wireless networks can increase both power demands at mobile devices and resource usage, e.g. air-time usage, by the mobile devices across the networks. Specifically, HetNet, MBO, and most other arbitration and load-balancing techniques require that both interfaces be in an operational state, thereby consuming large amounts of power & air-time. In particular, HetNet requires that both WiFi network and cellular network control capabilities, and corresponding network interfaces, are activated to estimate access quality for purposes of either switching between the active interfaces or using both of the interfaces to access network services. However, this increases power consumption at the mobile devices and resource, e.g. air-time, usage by the mobile devices.

The present includes systems, methods, and computer-readable media for solving these problems/discrepancies. Specifically, the present technology involves system, methods, and computer-readable media for controlling link selection and aggregation across multiple wireless networks based on a location of a mobile device. Additionally, the present technology involves systems, methods, and computer-readable media for selectively toggling network interfaces on a mobile device to control link selection and aggregation across multiple wireless networks based on a location of the mobile device.

Figure 6A:
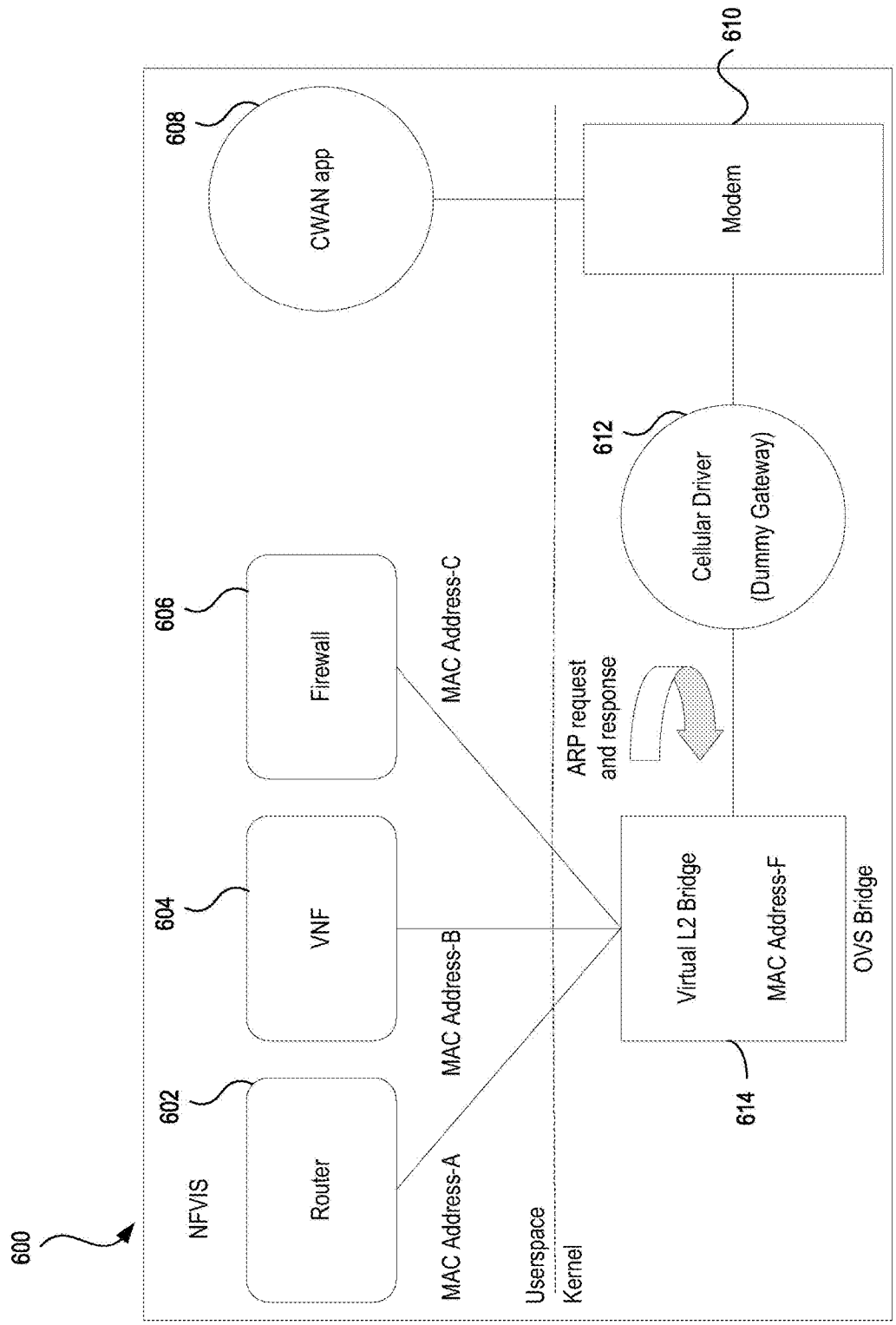
FIG. 6A illustrates an example of a topology of a network function virtualization infrastructure software in accordance with an embodiment.

FIG. 6A illustrates an example of a topology of a network function virtualization infrastructure software/hypervisor (NFVIS) 600 in accordance with an embodiment. The NFVIS system 600 can include a router 602, a virtual network function (VNF) 604, a firewall 606, a cellular application ("CWAN app") 608, a modem 610, a cellular driver 612, and a virtual L2-bridge 614.

The CWAN app 608 running on the NFVIS 600 can request for an IP address by initiating a call with the modem 610. The modem 610 can establish a packet data network (PDN) connectivity with an LTE/5G network and respond to the CWAN app 608 with an IP address assigned by the network, along with a subnet mask and a gateway. The IP address can then be assigned to the bridge interface 614 residing in the hypervisor 600 (e.g., NFVIS). The NFVIS 600 can auto-detect when the cellular link IP address changes and update the L2-bridge 614 with a different IP address acquired from the cellular modem 610, thereby adding routes for network connectivity. Cellular links can have flapping connections that dynamically change the IP address. By updating the L2-bridge 614 with different IP addresses, the NFVIS 600 and the L2-bridge 614 can continue to have connectivity with the cellular network.

Handling Uplink Packets Over the Cellular Interface

An example of an operation of handling uplink packets with an IP stack can include forwarding data over a network interface. The IP stack can be a Linux networking stack and can send an address resolution protocol (ARP) request for a media access control (MAC) address of a gateway that is connected to the network interface. Once the ARP request is resolved with a MAC address, the data can then be forwarded over the network interface.

However, a cellular interface does not have an L2 because it is a point-to-point over the air communication link. As such, to integrate the cellular interface with an Ethernet L2 network, the ARP request needs to be addressed. In one embodiment, the ARP requests can be intercepted for the gateway by the cellular driver 612 and responded to with a dummy/substitute MAC address (e.g., gateway_mac).

Moreover, the cellular driver 612 can learn the MAC address of the virtual L2-bridge 614 (e.g., bridge_mac shown as MAC address-F) from the ARP request. A header of the data packets that correspond with the gateway_mac can then be discarded by the cellular driver 612. The cellular driver 612 can then forward the data packet to the cellular network with the bridge_mac.

Handling Downlink Packets Over the Cellular Interface

When data packets come are received from the cellular interface, the cellular driver can add an L2 header to the data packets with a destination MAC address such as a bridge_mac and a gateway_mac as the source MAC address.

Figure 6B:
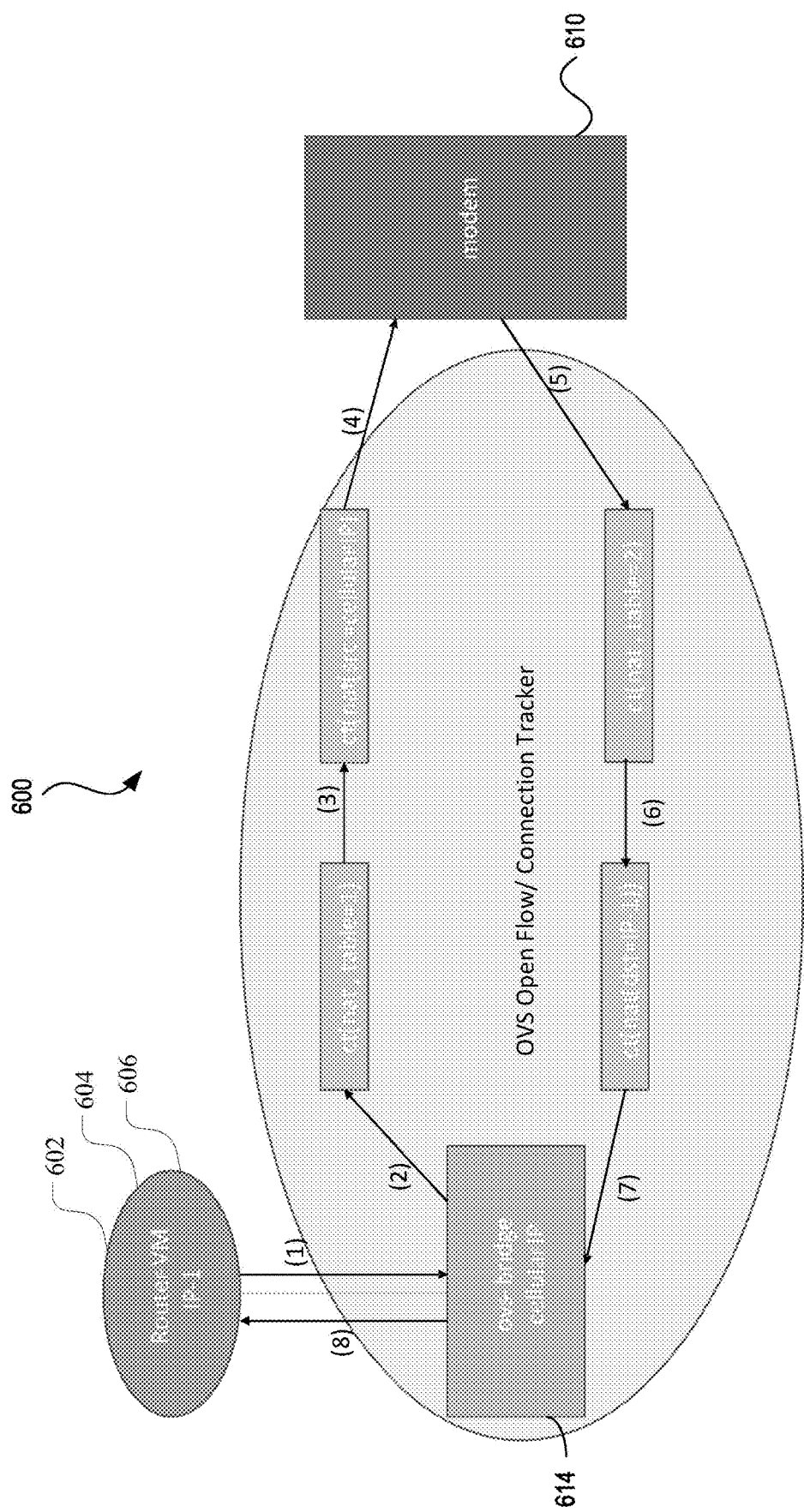
FIG. 6B illustrates an example of a topology of a network function virtualization infrastructure software in accordance with an embodiment.

In one example, an IP address can be assigned by a service provider over a cellular interface and be shared between the hypervisor 600 and virtual machines (VM) 602, 604, 606 running on the hypervisor 600. One embodiment can include:

a) the NFVIS 600 can create a virtual L2-bridge 614 and assign a cellular interface IP address to the virtual L2-bridge 614 with a cellular interface.

b) the NFVIS 600 can auto-detect whether the cellular link IP address changes and can update the virtual L2-bridge 614 with the acquired IP address and adds routes for network connectivity accordingly.

c) the virtual L2-bridge 614 can be an Open vSwitch (OVS) bridge that can implement a NAT/flow table that can handle the VMs 602, 604, 606 that are connected to the cellular L2-bridge 614. For example, the OVS bridge can utilize Open Flow and Connection Tracker modules where a NAT functionality can be implemented in the OVS bridge as shown in FIGS. 6A and 6B. As shown in FIG. 6B, the OVS bridge flows can utilize commands to generate a NAT flow table. Example commands include ovs-ofctl add-flow cellular-br "in_port=1, ip, action=ct(commit, nat(src=IP-Global))." FIG. 6B further illustrates an example of a topology of a network function virtualization infrastructure software in accordance with an embodiment. Paths (1)-(8) of FIG. 6B illustrate an example flow of a data packet between the Router-VM 602, 604, 606 with IP-1 and the modem 610. A NAT of cellular-IP can be utilized by the NFVIS 600 to provide an OVS Open Flow or Connection Tracker.

The MAC addresses (e.g., MAC address-A, MAC address-B, MAC address-C) of the VMs 602, 604, 606, as shown in FIG. 6A, can be mapped to MAC address-F of the cellular L2-bridge 614. On the downlink, the data packets can be modified to the appropriate source MAC-address based on the IP-tables/Flow tables of the virtual L2-bridge 614. This process can enable a single cellular interface IP address to be shared by the VMs 602, 604, 606 and the hypervisor 600.

FIG. 7 is a flowchart of a NFVIS workflow, according to some aspects of the disclosed technology. The method shown in FIG. 7 is provided by way of example, as there are a variety of ways to carry out the method. Additionally, while the example method is illustrated with a particular order of steps, those of ordinary skill in the art will appreciate that FIG. 7 and the modules shown therein can be executed in any order and can include fewer or more modules than illustrated. Each module shown in FIG. 7 represents one or more steps, processes, methods, or routines in the method.

At step 702, a CWAN application running on an NFVIS can request for an IP address by initiating a call with a modem.

At step 704, the modem can establish a data packet network connectivity with an LTE/5G network and respond to the CWAN application with an IP address assigned by the network, along with a subnet mask and a gateway.

At step 706, the IP address can then be assigned to the virtual bridge interface residing in the hypervisor (e.g., NFVIS).

At step 708, an Open vSwitch bridge can implement a NAT/flow table that can handle virtual machines that are connected to the cellular L2-bridge. The MAC-addresses (e.g., MAC address-A, MAC address-B, MAC address-C) of the virtual machines can be mapped to MAC address-F of the cellular L2-bridge. The data packets can be modified to the appropriate source MAC-address based on the IP-tables/Flow tables of the virtual L2-bridge.

At step 710, the NFVIS can auto-detect when the cellular link IP address changes and update the virtual L2-bridge with a different IP address acquired from the cellular modem, thereby adding routes for network connectivity.

At step 712, cellular links can have flapping connections that dynamically change the IP address. By updating the virtual L2-bridge with different IP addresses, the NFVIS and the L2-bridge can continue to have connectivity with the cellular network.

FIG. 8 illustrates an example of a network device 800 (e.g., switch, router, network appliance, etc.). The network device 800 can include a master central processing unit (CPU) 802, interfaces 804, and a bus 806 (e.g., a PCI bus). When acting under the control of appropriate software or firmware, the CPU 802 can be responsible for executing packet management, error detection, and/or routing functions. The CPU 802 preferably accomplishes all these functions under the control of software including an operating system and any appropriate applications software. The CPU 802 may include one or more processors 808 such as a processor from the Motorola family of microprocessors or the MIPS family of microprocessors. In an alternative embodiment, the processor 808 can be specially designed hardware for controlling the operations of the network device 800. In an embodiment, a memory 810 (such as non-volatile RAM and/or ROM) can also form part of the CPU 802. However, there are many different ways in which memory could be coupled to the system.

The interfaces 804 can be provided as interface cards (sometimes referred to as line cards). The interfaces 804 can control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 804 may include ports appropriate for communication with the appropriate media. In some cases, the interfaces 804 may also include an independent processor and, in some instances, volatile RAM. The independent processors may control communication intensive tasks such as packet switching, media control, and management. By providing separate processors for the communication intensive tasks, the interfaces 804 may allow the CPU 802 to efficiently perform routing computations, network diagnostics, security functions, and so forth.

Although the system shown in FIG. 8 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 800.

Regardless of the network device's configuration, it may employ one or more memories or memory modules (including the memory 810) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

FIG. 9 illustrates an example of a bus computing system 900 wherein the components of the system are in electrical communication with each other using a bus 905. The computing system 900 can include a processing unit (CPU or processor) 910 and a system bus 905 that may couple various system components including the system memory 915, such as read only memory (ROM) 920 and random access memory (RAM) 925, to the processor 910. The computing system 900 can include a cache 912 of high-speed memory connected directly with, in close proximity to, or integrated as part of the processor 910. The computing system 900 can copy data from the memory 915, ROM 920, RAM 925, and/or storage device 930 to the cache 912 for quick access by the processor 910. In this way, the cache 912 can provide a performance boost that avoids processor delays while waiting for data. These and other modules can control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in the storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing system 900, an input device 945 can represent any number of input mechanisms, such as a microphone for speech, a touch-protected screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing system 900. The communications interface 940 can govern and manage the user input and system output. There may be no restriction on operating on any particular hardware arrangement and therefore the basic features here may easily be substituted for improved hardware or firmware arrangements as they are developed.

The storage device 930 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 930 can include the software modules 932, 934, 936 for controlling the processor 910. Other hardware or software modules are contemplated. The storage device 930 can be connected to the system bus 905. In some embodiments, a hardware module that performs a particular function can include a software component stored in a computer-readable medium in connection with the necessary hardware components, such as the processor 910, bus 905, output device 935, and so forth, to carry out the function. For clarity of explanation, in some instances the present technology may be presented as including individual functional blocks including functional blocks comprising devices, device components, steps or routines in a method embodied in software, or combinations of hardware and software.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A computer-implemented method comprising:
   requesting, by a hypervisor, a cellular Internet Protocol (IP) address by initiating a call using a cellular modem of the hypervisor to establish data packet network connectivity with a cellular network;
   receiving, by the hypervisor, a cellular IP address assigned to a cellular modem of the hypervisor by the cellular network;
   assigning, by the hypervisor, the cellular IP address to a virtual Layer 2 (L2)-bridge interface of the hypervisor, wherein the cellular IP address is associated to a bridge Media Access Control (MAC) address of the virtual L2-bridge interface;
   mapping, by the hypervisor, a MAC address of a respective virtual machine included in a plurality of virtual machines associated with the hypervisor with the bridge MAC address of the virtual L2-bridge interface;
   based on the mapping, using the bridge MAC address as a source MAC address for the respective virtual machine or a destination MAC address for the respective virtual machine for communications between the respective virtual machine and the cellular network, wherein the plurality of virtual machines share the cellular IP address of the cellular modem of the hypervisor for communicating;
   detecting, by the hypervisor, a change in the cellular IP address assigned to the cellular modem of the hypervisor; and
   updating, by the hypervisor, the virtual L2-bridge interface with a different cellular IP address assigned to the cellular modem of the hypervisor while maintaining the data packet network connectivity.

2. The computer-implemented method of claim 1, wherein assigning the cellular IP address to the virtual L2-bridge interface is performed by the hypervisor.

3. The computer-implemented method of claim 1, wherein mapping the MAC address of the respective virtual machine with the bridge MAC address of the virtual L2-bridge interface is performed by the hypervisor.

4. The computer-implemented method of claim 1, wherein the bridge MAC address of the virtual L2-bridge interface is obtained in response to an address resolution protocol request.

5. The computer-implemented method of claim 1, further comprising using a cellular driver to replace respective source MAC addresses of data packets with the bridge MAC address of the virtual L2-bridge interface.

6. The computer-implemented method of claim 5, further comprising receiving the bridge MAC address of the virtual L2-bridge interface at the cellular driver based on an address resolution protocol request.

7. The computer-implemented method of claim 1, further comprising adding an L2 header to data packets from the plurality of virtual machines including the virtual machine, wherein the L2 header corresponds to the bridge MAC address of the virtual L2-bridge interface.

8. The computer-implemented method of claim 1, further comprising implementing a flow table by an Open vSwitch that maps the MAC address of the virtual machine to the bridge MAC address to connect the virtual machine with the virtual L2-bridge interface.

9. A system comprising:
one or more processors; and
at least one computer-readable storage medium having stored therein instructions which, when executed by the one or more processors, cause the system to:
request, by a hypervisor, a cellular Internet Protocol (IP) address by initiating a call using a cellular modem of the hypervisor to establish data packet network connectivity with a cellular network;
receive, by the hypervisor, a cellular IP address assigned to a cellular modem of the hypervisor by the cellular network;
assign, by the hypervisor, the cellular IP address to a virtual Layer 2 (L2)-bridge interface of the hypervisor, wherein the cellular IP address is associated to a bridge Media Access Control (MAC) address of the virtual L2-bridge interface;
map, by the hypervisor, a MAC address of a respective virtual machine included in a plurality of virtual machines associated with the hypervisor with the bridge MAC address of the virtual L2-bridge interface;
based on the mapping, use the bridge MAC address as a source MAC address for the respective virtual machine or a destination MAC address for the respective virtual machine for communications between the respective virtual machine and the cellular network, wherein the plurality of virtual machines share the cellular IP address of the cellular modem of the hypervisor for communicating;
detect, by the hypervisor, a change in the cellular IP address assigned to the cellular modem of the hypervisor; and
update, by the hypervisor, the virtual L2-bridge interface with a different cellular IP address assigned to the cellular modem of the hypervisor while maintaining the data packet network connectivity.

10. The system of claim 9, wherein the instructions are executed by a hypervisor.

11. The system of claim 9, wherein the bridge MAC address of the virtual L2-bridge interface is provided in response to an address resolution protocol request.

12. The system of claim 9, wherein the instructions which, when executed by the one or more processors, further cause the system to replace source MAC addresses of data packets with the bridge MAC address of the virtual L2-bridge interface by a cellular driver.

13. The system of claim 12, wherein the instructions which, when executed by the one or more processors, further cause the system to receive the bridge MAC address of the virtual L2-bridge interface at the cellular driver based on an address resolution protocol request.

14. The system of claim 9, wherein the instructions which, when executed by the one or more processors, further cause the system to add an L2 header to data packets from the plurality of virtual machines including the virtual machine, wherein the L2 header corresponds to the bridge MAC address of the virtual L2-bridge interface.

15. The system of claim 9, wherein the instructions which, when executed by the one or more processors, further cause the system to implement a flow table by an Open vSwitch that maps the MAC address of the virtual machine to the bridge MAC address to connect the virtual machine with the virtual L2-bridge interface.

16. A non-transitory computer-readable storage medium comprising instructions stored on the non-transitory computer-readable storage medium, wherein the instructions, when executed by one more processors, cause the one or more processors to:
request, by a hypervisor, a cellular Internet Protocol (IP) address by initiating a call using a cellular modem of the hypervisor to establish data packet network connectivity with a cellular network;
receive, by the hypervisor, a cellular IP address assigned to a cellular modem of the hypervisor by the cellular network;
assign, by the hypervisor, the cellular IP address to a virtual Layer 2 (L2)-bridge interface of the hypervisor, wherein the cellular IP address is associated to a bridge Media Access Control (MAC) address of the virtual L2-bridge interface;
map, by the hypervisor, a MAC address of a respective virtual machine included in a plurality of virtual machines associated with the hypervisor with the bridge MAC address of the virtual L2-bridge interface;
based on the mapping, use the bridge MAC address as a source MAC address for the respective virtual machine or a destination MAC address for the respective virtual machine for communications between the respective virtual machine and the cellular network, wherein the plurality of virtual machines share the cellular IP address of the cellular modem of the hypervisor for communicating;
detect, by the hypervisor, a change in the cellular IP address assigned to the cellular modem of the hypervisor; and
update, by the hypervisor, the virtual L2-bridge interface with a different cellular IP address assigned to the cellular modem of the hypervisor while maintaining the data packet network connectivity.

17. The non-transitory computer-readable storage medium of claim 16, wherein the instructions are executed by a hypervisor.

18. The non-transitory computer-readable storage medium of claim 16, wherein the bridge MAC address of the virtual L2-bridge interface is provided in response to an address resolution protocol request.

19. The non-transitory computer-readable storage medium of claim 16, wherein the instructions which, when executed by the one or more processors, further cause the one or more processors to replace source MAC addresses of data packets with the bridge MAC address of the virtual L2-bridge interface by a cellular driver.

20. The non-transitory computer-readable storage medium of claim 16, wherein the instructions which, when executed by the one or more processors, further cause the one or more processors to add an L2 header to data packets from the plurality of virtual machines including the virtual machine, wherein the L2 header corresponds to the bridge MAC address of the virtual L2-bridge interface.

\* \* \* \* \*